United States Patent
Robison et al.

(10) Patent No.: US 9,894,062 B2
(45) Date of Patent: Feb. 13, 2018

(54) OBJECT MANAGEMENT FOR EXTERNAL OFF-HOST AUTHENTICATION PROCESSING SYSTEMS

(71) Applicant: Dell Products, L.P., Round Rock, TX (US)

(72) Inventors: Charles D. Robison, Buford, GA (US); Daniel L. Hamlin, Round Rock, TX (US)

(73) Assignee: Dell Products, L.P., Round Rock, TX (US)

( * ) Notice: Subject to any disclaimer, the term of this patent is extended or adjusted under 35 U.S.C. 154(b) by 171 days.

(21) Appl. No.: 15/071,628

(22) Filed: Mar. 16, 2016

(65) Prior Publication Data

US 2017/0272427 A1 Sep. 21, 2017

(51) Int. Cl.
*H04L 29/06* (2006.01)
(52) U.S. Cl.
CPC ...... *H04L 63/0853* (2013.01); *H04L 63/0861* (2013.01)
(58) Field of Classification Search
CPC .................. H04L 63/0853; H04L 63/0861
See application file for complete search history.

(56) References Cited

U.S. PATENT DOCUMENTS

| | | | | |
|---|---|---|---|---|
| 5,764,789 A * | 6/1998 | Pare, Jr. | ................. | G06F 21/32 382/115 |
| 7,319,987 B1 * | 1/2008 | Hoffman | ................. | G06Q 20/40 705/44 |
| 2002/0126882 A1 * | 9/2002 | Funahashi | ................. | G06K 9/00087 382/124 |
| 2002/0152400 A1 * | 10/2002 | Zhang | ................. | G06F 21/10 726/5 |
| 2003/0005291 A1 * | 1/2003 | Burn | ................. | G06F 21/34 713/159 |
| 2003/0011758 A1 * | 1/2003 | Ochiai | ................. | G06F 21/32 356/71 |
| 2003/0208562 A1 * | 11/2003 | Hauck | ................. | H04L 63/08 709/219 |
| 2004/0123105 A1 * | 6/2004 | Himmel | ................. | G06F 21/6218 713/167 |

(Continued)

OTHER PUBLICATIONS

Broadcom Corporation, "BCM5880 Cryptographic Module Security Policy, Document Version 1.1", Revision Date: Feb. 2, 2010, 28 Pages.

*Primary Examiner* — Darren B Schwartz
(74) *Attorney, Agent, or Firm* — Fogarty LLP

(57) ABSTRACT

Systems and methods for providing object management for external off-host authentication processing systems are described. In some embodiments, a method may include: identifying, by an Information Handling System (IHS), raw data to be stored within an object in an off-host memory of an external off-host authentication processing system coupled to the IHS, wherein the external off-host authentication processing system provides a hardware environment segregated from the IHS; collecting authentication data from a user by prompting the user; generating a system identification (ID) that uniquely characterizes the IHS without prompting the user; and storing the authentication data, the system ID, and the raw data as part of the object in the off-host memory.

17 Claims, 6 Drawing Sheets

(56) References Cited

U.S. PATENT DOCUMENTS

| | | | | |
|---|---|---|---|---|
| 2004/0170278 A1* | 9/2004 | Schipper | ............ | H04L 63/0442 380/239 |
| 2006/0029261 A1* | 2/2006 | Hoffman | ............... | G06Q 20/12 382/115 |
| 2006/0036857 A1* | 2/2006 | Hwang | .................. | G06F 21/31 713/168 |
| 2007/0007358 A1* | 1/2007 | White | .................. | G06F 21/606 235/492 |
| 2007/0014407 A1* | 1/2007 | Narendra | ............... | G06F 21/32 380/259 |
| 2008/0086764 A1* | 4/2008 | Kulkarni | ................ | G06F 21/33 726/7 |
| 2011/0023103 A1* | 1/2011 | Dietrich | ................. | G06F 21/31 726/9 |
| 2011/0296512 A1* | 12/2011 | Dietrich | ................. | G06F 21/34 726/9 |
| 2012/0249292 A1* | 10/2012 | Wong | ..................... | G06F 21/32 340/5.52 |
| 2014/0365782 A1* | 12/2014 | Beatson | ................ | G06F 21/32 713/186 |
| 2015/0242602 A1* | 8/2015 | Skygebjerg | .......... | H04L 63/126 726/7 |
| 2015/0319171 A1 | 11/2015 | Robison et al. | | |

* cited by examiner

OBJECT MANAGEMENT FOR EXTERNAL OFF-HOST AUTHENTICATION PROCESSING SYSTEMS

FIELD

This disclosure relates generally to Information Handling Systems (IHSs), and more specifically, to object management for external off-host authentication processing systems.

BACKGROUND

As the value and use of information continues to increase, individuals and businesses seek additional ways to process and store information. An option is an Information Handling System (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, global communications, etc. In addition, IHSs may include a variety of hardware and software components that may be configured to process, store, and communicate information and may include one or more computer systems, data storage systems, and networking systems.

In some cases, an IHS may be secured through the use of authentication such that users are required to provide credentials before they can fully access the IHS (or certain features thereof). Examples of such credentials include may include a passcode, pass phrase, personal identification number, challenge response, fingerprint, retinal scan, face identification, voice identification, identification card, etc.

In a conventional IHS, authentication credentials are verified by a host processor within the IHS to determine whether the user is authorized to access it. If so, the user is logged into the IHS and can then access its functionality. The inventors hereof have recognized, however, that authentication of a user by a host processor in the IHS raises a number of security issues, because unauthorized persons may gain access to that processor and manipulate the authentication process itself.

SUMMARY

Embodiments of systems and methods for providing object management for external off-host authentication processing systems are described herein. In an illustrative, non-limiting embodiment, a method may include identifying, by an Information Handling System (IHS), raw data to be stored within an object in an off-host memory of an external off-host authentication processing system coupled to the IHS, wherein the external off-host authentication processing system provides a hardware environment segregated from the IHS; collecting authentication data from a user by prompting the user; generating a system identification (ID) that uniquely characterizes the IHS without prompting the user; and storing the authentication data, the system ID, and the raw data as part of the object in the off-host memory.

In some cases, the raw data may include an encryption key or fingerprint template. For example, the authentication data may include a fingerprint template, a magnetic card scan, a Radio Frequency Identification (RFID) scan, a Smart Card scan, a face recognition template, an iris template, a certificate, or a passcode.

Generating the system ID may include retrieving or generating an identification of a hardware component of the IHS. The system ID may include an identification of a Central Processing Unit (CPU) of the IHS. Generating the system ID may include retrieving or generating an identification or signature of a software component installed in the IHS.

The external off-host authentication processing system may be coupled to the IHS using a protocol that cryptographically tie communications between the external off-host authentication processing system and an embedded controller (EC) of the IHS without intervention by any Operating System (OS) executed by the IHS.

The method may further include: receiving, at the external off-host authentication processing system, a request from a calling application executed by the IHS to access the object stored in the off-host memory; collecting, via the IHS, new authentication data from a user by prompting the user; generating, via the IHS, a new system ID without prompting the user; determining, by the external off-host authentication processing system, that the new authentication data and new system ID match the authentication data and system ID stored in the object; and retrieving, by external off-host authentication processing system, the object from the off-host memory.

Alternatively, the method may include: receiving, at the external off-host authentication processing system, a request from a calling application executed by the IHS to access the object stored in the off-host memory; collecting, via another IHS, new authentication data from a user by prompting the user; generating, via the other IHS, a new system ID without prompting the user; determining, by the external off-host authentication processing system, that the new authentication data matches the authentication data stored in the object but that the new system ID does not match the system ID stored in the object; and denying the request.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity, and have not necessarily been drawn to scale.

DETAILED DESCRIPTION

In various embodiments, systems and methods described herein may provide object management for external off-host authentication processing systems. For purposes of this disclosure, an Information Handling System (IHS) may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an IHS may be a personal computer, a PDA, a consumer electronic device, a network server or storage device, a switch router or other network communication device, or any other suitable device and may vary in size, shape, performance, functionality, and price. The IHS may include memory, one or more processing resources such as a central processing unit (CPU) or hardware or software control logic. Additional components of the IHS may include one or more storage devices, one or more communications ports for communicating with external devices as well as various input and output (I/O) devices, such as a keyboard, a mouse, and a video display. The IHS may also include one or more buses operable to transmit communications between the various hardware components.

Figure 1:
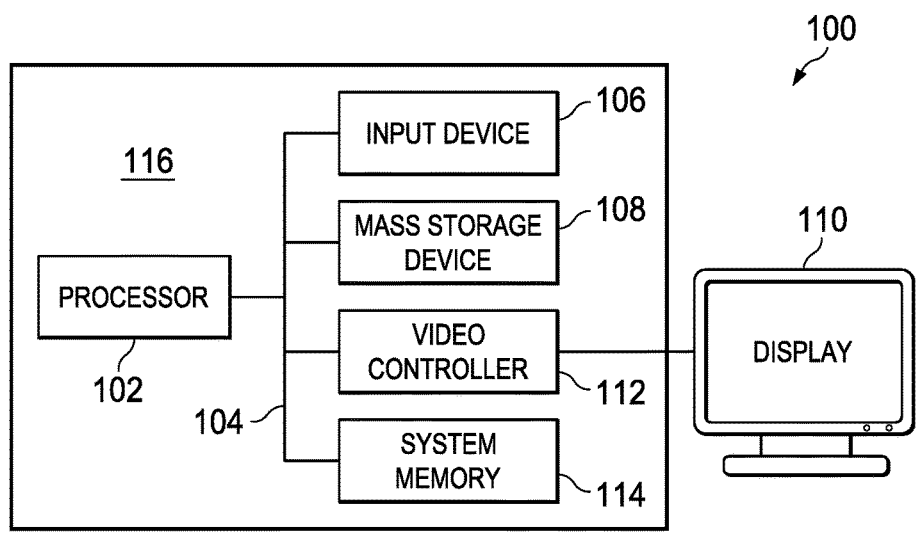
FIG. 1 is a schematic view illustrating an example of an Information Handling System (IHS) according to some embodiments.

FIG. 1 is a schematic view illustrating an example of an IHS according to some embodiments. As shown, IHS 100 includes processor 102, which is connected to bus 104. Bus 104 serves as a connection between processor 102 and other components of IHS 100. Input device 106 is coupled to processor 102 to provide input to processor 102. Examples of input devices may include keyboards, touchscreens, pointing devices such as mice, trackballs, and trackpads, and/or a variety of other input devices. Programs and data are stored on mass storage device 108, which is coupled to processor 102. Examples of mass storage devices may include hard discs, optical disks, magneto-optical discs, solid-state storage devices, and/or a variety other mass storage devices.

IHS 100 further includes display 110, which is coupled to processor 102 by video controller 112. System memory 114 is coupled to processor 102 to provide it with fast storage to facilitate execution of computer programs by processor 102. Examples of system memory 114 may include random access memory (RAM) devices such as dynamic RAM (DRAM), synchronous DRAM (SDRAM), solid state memory devices, and/or a variety of other memory devices.

In various embodiments, chassis 116 houses some or all of the components of IHS 100, but to the exclusion of external off-host authentication processing system 206, as discussed in more detail below. It should be understood that other buses and intermediate circuits may be deployed between the components described above and processor 102 to facilitate interconnection between those components and processor 102.

Figure 2:
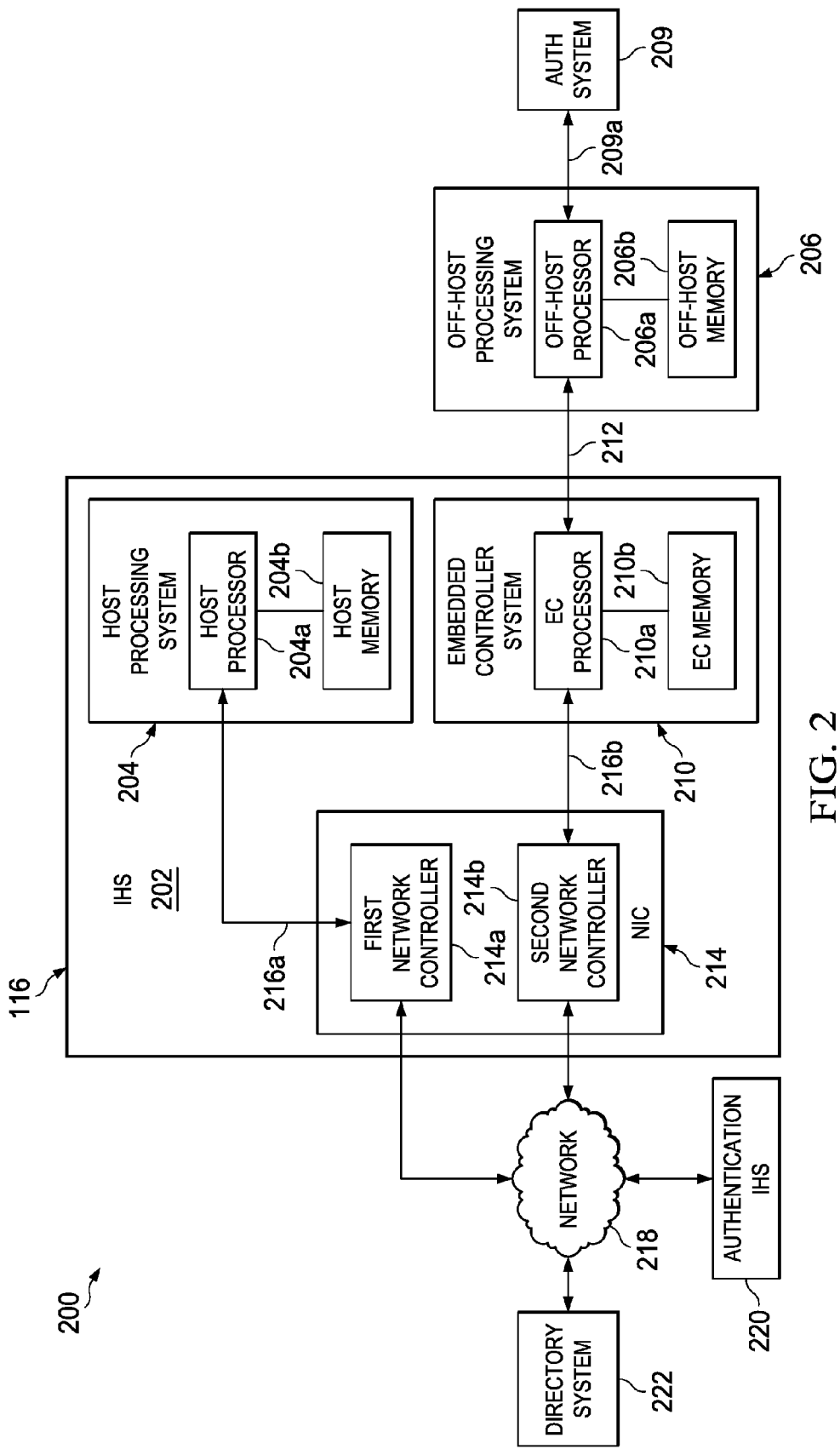
FIG. 2 is a schematic view illustrating an example of an environment where an external off-host authentication processing system may be used according to some embodiments.

Referring now to FIG. 2, an embodiment of environment 200 where external off-host authentication processing system 206 may be used is illustrated. Environment 200 includes IHS 202, which may be IHS 100 discussed above and/or may include some or all of the components of IHS 100. For example, IHS 202 may be a server IHS, a desktop IHS, a laptop/notebook IHS, a tablet IHS, a mobile phone IHS, and/or a variety of other IHSs. IHS 202 comprises host processing system 204 that includes host processor 204a, host memory 204b, and/or a variety of other components.

For example, host processor 204a of host processing system 204 may include processor 102, whereas host memory 204b may include system memory 114. More generally, host processing system 204 may include a variety of processing systems utilized by IHS 202 to perform processing operations related to, for example, executing an Operating System (OS) and/or other software applications.

IHS 202 also comprises embedded controller system 210 that includes embedded controller processor 210a, embedded controller memory 210b, and/or a variety of other embedded controller components. For example, embedded controller processor 210a in embedded controller system 210 may include a processor, and embedded controller memory 210b in the embedded controller system 210 may include a memory device that includes instructions that, when executed by embedded controller processor 210a, cause embedded controller processor 210a to perform operations discussed further below.

IHS 202 also includes network interface controller 214 that provides first network controller 214a, second network controller 214b, and/or that includes a variety of other network interface controller components. In some embodiments, network interface controller 214 is compliant with INTEL CORPORATION's Active Management Technology (AMT) and/or "vPro" technology. In an embodiment, first network controller 214a in network interface controller 214 may be segregated, distinct from, and/or otherwise separate from second network controller 214b by assigning to the first network controller 214a a first Media Access Control (MAC) address that is different from a second MAC address that is assigned to the second network controller 214b. In another embodiment, first network controller 214a and second network controller 214b may be segregated from each other in another manner such as, for example, by providing first network controller 214a on a different network interface controller than second network controller 214b.

Host processor 204a in host processing system 204 is coupled to first network controller 214a in network interface controller 214 via bus 216a, and embedded controller processor 210a in embedded controller system 210 is coupled to second network controller 214b in network interface controller 214 via bus 216b. In some embodiments, buses 216a and 216b may be part of the same bus such as, for example, an I²C connection that couples host processing system 204 and embedded controller system 210 to network interface controller 214. However, bus 214 may be any variety of physical/logical bus connections that support encrypted communications, including but not limited to, I²C, USB, Thunderbolt, SPI, PCI, and/or other bus connections.

Host processor 204a may be configured to only have access to the first network controller 214a by providing host processor 204a a first MAC address that is assigned to first network controller 214a, while embedded controller processor 210a may be configured to only have access to second network controller 214b by providing embedded controller processor 210a a second MAC address that is assigned to second network controller 214b. However, as discussed above, first network controller 214a and second network controller 214b may be provided on different network interface controllers such that buses 216a and 216b are physically separate buses.

IHS 202 is coupled to external off-host authentication processing system 206 that includes off-host processor 206a, off-host memory 206b, and/or a variety of other off-host processing components. It should be noted that the term "external" refers to external off-host authentication processing system 206 being physically disposed outside of chassis 116—that is, off-host authentication processing system 206 is not a part of IHS 202; and it coupled to it via bus 212. Moreover, the term "off-host" refers to external off-host authentication processing system 206 being distinct from host processing system 204.

Particularly, off-host processor 206a within external off-host authentication processing system 206 may include a secure processor that is segregated, distinct from, and/or otherwise separate from processor 102 in IHS 100, and off-host memory 206b within external off-host authentication processing system 206 may include a memory device that is segregated, distinct from, and/or otherwise separate from system memory 114 in the IHS 100 such that off-host memory 206b is accessible by off-host processor 206a but not by host processor 204a. In one example, off-host authentication processing system 206 may be provided, at least in part, using a CONTROLVAULT system that is available from DELL, INC.

In the illustrated embodiment, embedded controller processor 210a is coupled to off-host processor 206a via bus 212 such as, for example, an LPC connection. However, the bus 212 may be any variety of physical/logical bus connections that support cryptographic communications, including but not limited to, an LPC connection, a USB connection, a Thunderbolt interface, an I²C, an SPI, a PCI, and/or other bus connections.

In some implementations, off-host processing system 206 may be a USB device and bus 212 may be from off-host processing system 206 to a USB hub within IHS 202. In that case, communications over bus 212 may get processed by the USB driver stack at the host layer, then routed to embedded controller system 210. In other implementations, off-host processing system 206 may be a USB Type-C device. A USB Type-C controller within IHS 202 may be connected to a Platform Controller Hub (PCH) and it may route data directly to embedded controller 210 without presenting that data to host processing system 204. In yet other implementations, a dedicated USB controller may be connected directly and only to embedded controller 210.

Importantly, the fact that external off-host authentication processing system 206 is both "off-host" and also "external" raises unique security issues that are not encountered by conventional authentication systems that are either external or off-host, but not both. For example, because external off-host authentication processing system 206 is both off-host and external, it may be coupled to different IHSs at different times by any given user. These, and other issues, may be addressed using various techniques described herein.

Authentication system or device 209 may include, for example, an input device such as a keyboard, a fingerprint reader device or other biometric data reader device, a smart card reader device, an radio frequency identification (RFID) or Near Field Communication (NFC) device that is configured to wirelessly connect to a mobile user device (e.g., a mobile phone), and/or a variety of other authentication devices. Authentication device 209 may be coupled to off-host processor 206 in external off-host authentication processing system 206 via USB or Smart Card Interface (SCI) bus 209a. However, bus 209a may be any variety of physical/logical bus connections including but not limited to, the USB, SCI, Thunderbolt, I²C, SPI, PCI, and/or other bus connections.

Each of first network controller 214a and second network controller 214b is coupled to network 218 such as, for example, a local area network (LAN), the Internet, and/or a variety of other networks.

Authentication IHS 220 is coupled to network 218. In an embodiment, authentication IHS 220 may be implemented as IHS 100 discussed above with reference to FIG. 1 and/or may include some or all of the components of IHS 100. For example, authentication IHS 220 may be a server IHS or authentication server that may operates to verify user authentication credential inputs and/or verify authentication tokens. In an embodiment, authentication IHS 220 is associated with at least one authentication IHS private key and at least one authentication IHS public key. The at least one authentication IHS private key and the at least one authentication IHS public key may be stored in storage device that is accessible by authentication IHS 220.

In an embodiment, IHS 202 is associated with at least one user IHS private key and at least one user IHS public key. The at least one user IHS private key and the at least one user IHS public key may be stored in storage device that is accessible by external off-host authentication processing system 206. For example, the at least one user IHS private key and the at least one user IHS public key may be stored on off-host memory 206b, on host memory 204b, and/or in a variety of other user IHS storage locations. The at least one user IHS public key may be shared with other systems such as, for example, authentication IHS 220.

Directory system 222 is also coupled to network 218. In an embodiment, directory system 222 may include an active directory service available from MICROSOFT CORPORATION. For example, directory system 222 may include an active directory service that is provided on a server IHS and that operates to authenticate and authorize users, assign and enforce security policies, install and update software, and/or perform a variety of other directory system operations.

In an embodiment, network 218, authentication IHS 220, and directory system 222 may be controlled by the same entity. For example, a business or government entity may provide, house, and otherwise maintain control of each of network 218, authentication IHS 220, and directory system 222 in order to provide an increased level of security using environment 200.

Figure 3:
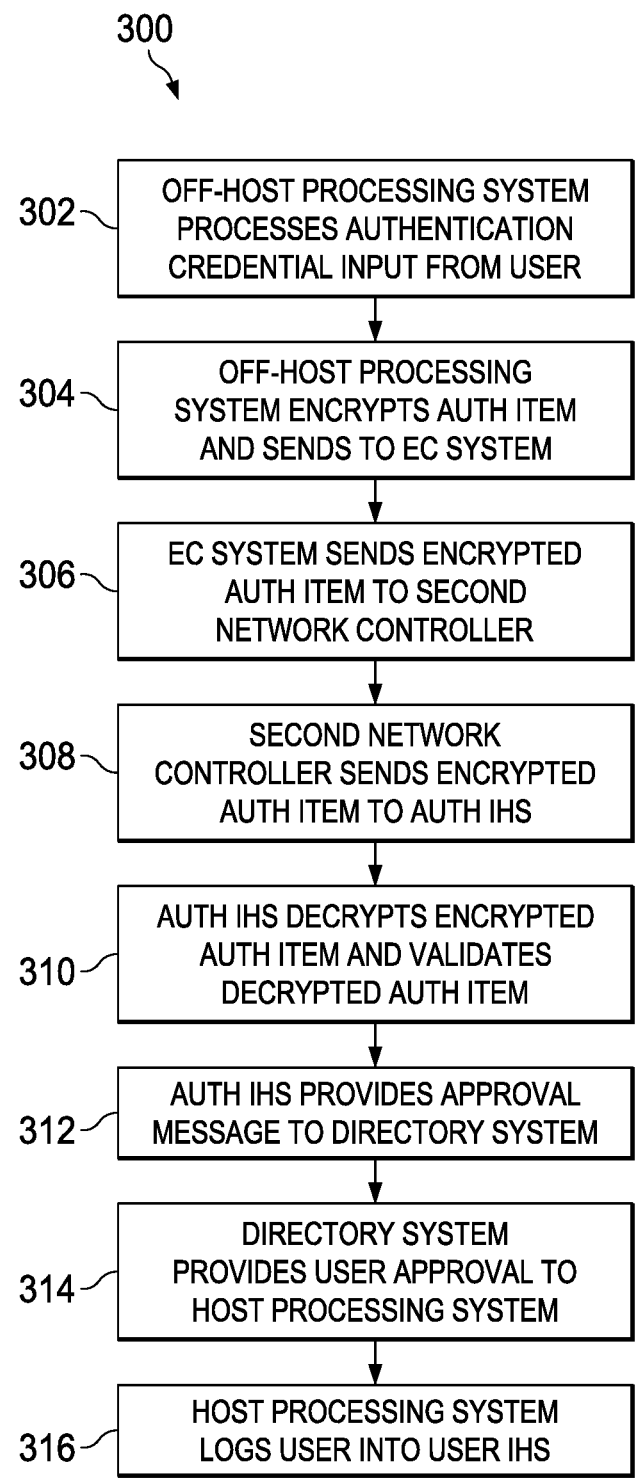
FIG. 3 is a flowchart illustrating an example of a method for off-host authentication according to some embodiments.
Figure 4:
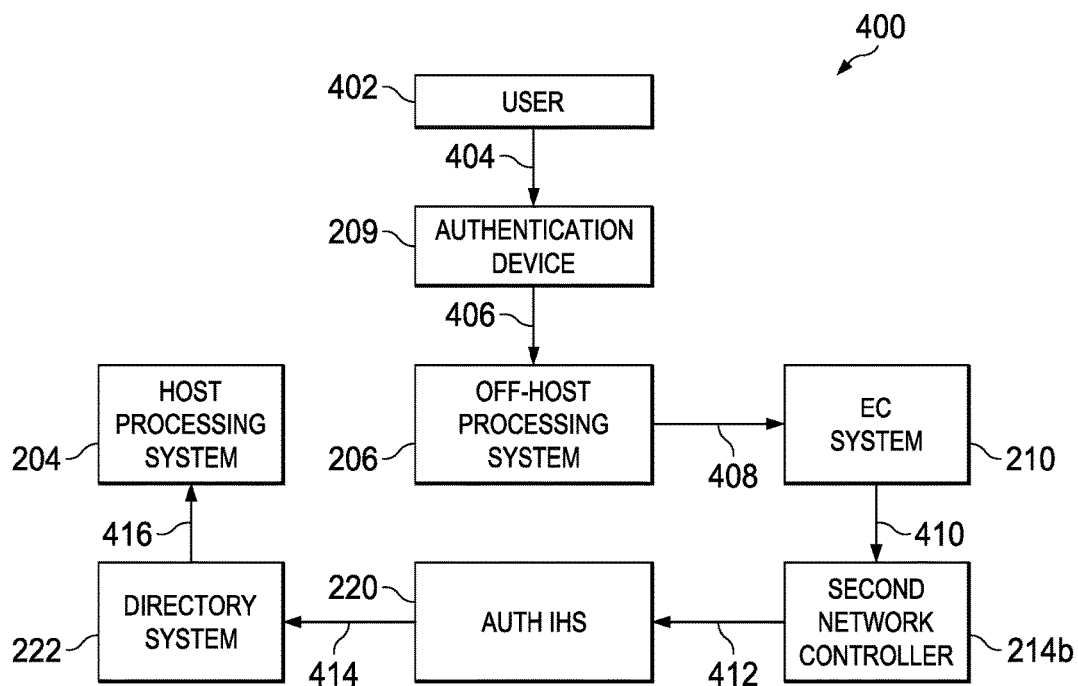
FIG. 4 is a schematic flow diagram illustrating an example of communications in the environment of FIG. 2 during execution of the method of FIG. 3 according to some embodiments.

Referring now to FIGS. 2, 3, and 4, an embodiment of method 300 for providing off-host authentication is illustrated. In the embodiments discussed below, IHS 202 is a secure user IHS that only provides access to IHS functionality in response to a user being authenticated by external off-host authentication processing system 206. For example, a system administrator may have previously (e.g., prior to the method 300) identified one or more users as authenticated users that may access IHS functionality of IHS 202 that is provided by host processing system 204, and registered those authenticated users with authentication IHS 220 and/or external off-host authentication processing system 206. The identification and registration of authenticated users may include associating authentication credentials of the authenticated users with access to the user IHS (or one of a plurality of different levels of access to IHS 202 that may vary in IHS functionality) in a storage device of authentication IHS 220 and/or the off-host memory 206b.

Method 300 is described with reference to the schematic flow 400 of FIG. 4 that illustrates an embodiment of the flow of communications between the various components discussed herein during execution of method 300. Particularly, method 300 begins at block 302 where external off-host authentication processing system 206 processes an authentication credential input that is received from a user. As illustrated in FIG. 4, user 402 performs authentication action 404 using authentication device 209, and authentication device 209 then sends authentication credential input 406 over bus 209a to external off-host authentication processing system 206.

For example, user 402 may perform authentication action 404 by using a keyboard authentication device to provide a username and passcode; by using a biometric authentication device to provide a fingerprint scan, retinal scan, and/or other biometric authentication credential; by using a smart card reader device to provide authentication information stored on a smart card; by using a mobile user device to wirelessly transmit an authentication credential stored on the mobile user device to an RFID or NFC authentication device; etc., and authentication device 209 then converts that authentication action 404 into authentication credential input 406 and sends that authentication credential input 406 over bus 209a to off-host processor 206a in external off-host authentication processing system 206.

In some embodiments off-host authentication processing system 206 may operate at block 302 to process the authentication credential input by using the authentication credential input received from authentication device 209 to validate the user 402 locally. For example, off-host processor 206a may compare the received authentication credential input to valid authentication credentials (e.g., that were previously provided by a system administrator) that are stored in the off-host memory 206b to determine whether the received authentication credential input matches any valid authentication credentials that are associated with authenticated users.

Off-host processor 206a may process the received authentication credential input (e.g., provided via a fingerprint scan authentication action) to produce a candidate authentication credential (e.g., a candidate fingerprint), and compare that candidate authentication credential to authentication credential templates (e.g., fingerprint patterns) stored in off-host memory 206b to determine whether the candidate authentication credential matches any of the authentication credential templates. Processing of the candidate fingerprint may include determining a center point of the candidate fingerprint, centering on that center point, and aligning the candidate fingerprint with an orientation of fingerprint templates that are stored in off-host memory 206b such that the candidate fingerprint may be compared to the fingerprint templates that are stored in off-host memory 206b to determine whether a match exists, and/or a variety of other candidate authentication credential processing operations.

In other embodiments, off-host processor 206a may perform the processing of the candidate authentication credential in substantially the same manner as discussed above, but with the provision that authentication credential templates are not stored in off-host memory 206b such that off-host processor 206a does not compare the processed candidate authentication credential to authentication credential templates.

As discussed above, host processor 204a in the host processing system 204 may be segregated, distinct from, and/or otherwise separate from the external off-host authentication processing system 206 and, as such, any control of host processing system 204 (e.g., by an unauthorized user) does not result in access to the authentication credential input provided by user 402 and processed by external off-host authentication processing system 206.

Method 300 then proceeds to block 304 where external off-host authentication processing system 206 encrypts an authentication item and sends the encrypted authentication item to embedded controller system 210. In an embodiment, following the processing of the authentication credential input at block 302, off-host processor 206a operates to encrypt an authentication item and send that encrypted authentication item 408 over bus 212 to embedded controller processor 210a. In embodiments where the authentication credential input was processed to validate user 402 locally, off-host processor 206a operates at block 304 to retrieve an authentication token from off-host memory 206b, encrypt the authentication token to produce an encrypted authentication token (i.e., the encrypted authentication item), and send the encrypted authentication token over bus 212 to embedded controller system 210. For example, off-host processor 206a may retrieve an authentication token from off-host memory 206b that is also stored in authentication IHS 220, encrypt that authentication token with a user IHS private key and an authentication IHS public key to produce the encrypted authentication token, and send the encrypted authentication token over bus 212 to embedded controller processor 210a.

In an embodiment, external off-host authentication processing system 206 also sends user IHS information along with the encrypted authentication token. For example, the off-host processor 206a may retrieve information about IHS 202 such as, for example, hardware information (e.g., unique identifiers) for attached devices (e.g., a Trusted Platform Module (TPM), off-host processor 206a, host processor 204a, etc.), BIOS information, software information, and/or a variety of other user IHS information, and send that user IHS information along with the encrypted authentication token to embedded controller processor 210a.

In embodiments where the authentication credential input is processed for authentication by a non-local system to produce the processed authentication credential, discussed above, off-host processor 206a operates at block 304 to encrypt the processed authentication credential to produce an encrypted processed authentication credential (i.e., the encrypted authentication item), and to send the encrypted processed authentication credential over bus 212 to embedded controller system 210. For example, off-host processor 206a may encrypt the processed authentication credential with a user IHS private key and an authentication IHS public key to produce the encrypted processed authentication credential, and send the encrypted processed authentication credential over bus 212 to embedded controller processor 210a. Similarly as discussed above, external off-host authentication processing system 206 may also send user IHS information along with the encrypted processed authentication credential.

Method 300 then proceeds to block 306 where embedded controller system 210 sends the encrypted authentication item to second network controller 214b. In an embodiment, embedded controller processor 210a operates at block 306 to send encrypted authentication item 410 that was received from off-host processor 206a over bus 216b to second network controller 214b in network interface controller 214.

For example, embedded controller processor 210a may use the second MAC address assigned to second network controller 214b to send the encrypted authentication item to second network controller 214b. As discussed above, first network controller 214a in network interface controller 214 may be segregated, distinct from, and/or otherwise separate from second network controller 214b by assigning the first network controller 214a a first MAC address that is different from a second MAC address that is assigned to second network controller 214b and, as such, any control of the host processing system 204 (e.g., by an unauthorized user) will not result in access to the encrypted authentication item (i.e., because host processing system 204 does not have access to second network controller 214b).

Method 300 then proceeds to block 308, where second network controller 214b sends the encrypted authentication item to authentication IHS 220. In an embodiment, second network controller 214b operates at block 308 to send encrypted authentication item 412 received from embedded controller processor 210a over network 218 to authentication IHS 220. Second network controller 214b may have access to authentication IHS 220 over network 218 that is not provided to first network controller 214a, and at block 308 may use that access to send the encrypted authentication item to authentication IHS 220. In such embodiments, the restriction of access to authentication IHS 220 to second network controller 214b prevents any control of host processing system 204 (e.g., by an unauthorized user) from resulting in access to authentication IHS 220 (i.e., because the host processing system 204 only has access to first network controller 214a).

Method 300 then proceeds to block 310, where authentication IHS decrypts the encrypted authentication item and validates the decrypted authentication item. In an embodiment of block 310, authentication IHS 220 operates to decrypt the encrypted authentication item received from second network controller 214b to produce a decrypted authentication item and then validates that decrypted authentication item by determining if the decrypted authentication item matches an authentication item stored in authentication IHS 220. In embodiments where the authentication credential input was processed by external off-host authentication processing system 206 to validate user 402 locally, authentication IHS 220 operates to decrypt the encrypted authentication token to produce a decrypted authentication token, and then determines whether the decrypted authentication token matches an authentication token that is stored in authentication IHS 220 in order to validate that decrypted authentication token. For example, authentication IHS 220 may receive the encrypted authentication token, decrypt the encrypted authentication token using a authentication IHS private key and a user IHS public key to produce the decrypted authentication token, and check a database in the authentication IHS 220 to validate the decrypted authentication token by determining whether that decrypted authentication token matches an authentication token in that database. If the decrypted authentication token does not match an authentication token that is stored in authentication IHS 220, authentication IHS 220 sends a message to directory system 222 that user 402 is not authorized to access IHS 202, and directory system 222 communicates with IHS 220 to inform IHS 202 that the user is not authorized to access IHS 202. If the decrypted authentication token matches an authentication token that is stored in authentication IHS 220, authentication IHS 220 validates the decrypted authentication token.

In embodiments where the authentication credential input was processed by the external off-host authentication processing system 206 to produce the processed authentication credential, discussed above, authentication IHS 220 operates to decrypt the encrypted processed authentication credential to produce a decrypted processed authentication credential, compare the decrypted processed authentication credential to valid authentication credentials (e.g., that were previously provided by a system administrator) that are stored in authentication IHS 220 to validate the decrypted processed authentication credential by determining whether the decrypted processed authentication credential matches any valid authentication credentials that are associated with authenticated users in authentication IHS 220. For example, authentication IHS 220 may receive the encrypted processed authentication credential, decrypt the encrypted processed authentication credential using a authentication IHS private key and a user IHS public key to produce the decrypted processed authentication credential, and check a database in authentication IHS 220 to validate the decrypted processed authentication credential by determining whether that decrypted processed authentication credential matches a valid authentication credential in that database. If the decrypted processed authentication credential does not match a valid authentication credential that is stored in authentication IHS 220, authentication IHS 220 sends a message to directory system 222 that user 402 is not authorized to access IHS 202, and directory system 222 communicates with user IHS 220 to inform user IHS 202 that the user is not authorized to access IHS 202. If the decrypted processed authentication credential matches a valid authentication credential that is stored in authentication IHS 220, authentication IHS 220 validates the decrypted processed authentication credential.

Method 300 then proceeds to block 312 where authentication IHS 220 provides an approval message and IHS information to directory system 222. In an embodiment, following the validation of the decrypted authentication item, authentication IHS 220 operates to send approval message 414 to directory system 222 over network 218. For example, authentication IHS 220 may send directory system 222 an approval message that indicates that the authentication item sent from external off-host authentication processing system 206 at block 304 has been validated (e.g., "user 402 authenticated by authentication IHS 220"). In addition, authentication IHS 220 may send IHS information along with the approval message. In an example, authentication IHS 220 may send information about IHS 202 that was sent by external off-host authentication processing system 206 at block 304. In another example, authentication IHS 220 may retrieve information about IHS 202 such as, for example, the name of the user 402, the name of IHS 202, and/or a variety of other user IHS information art, and send that information along with the approval message to directory system 222.

Method 300 then proceeds to block 314 where directory system 222 provides a user approval to host processing system 204. In an embodiment, in response to receiving the approval message from authentication IHS 220, directory system 222 provides authentication token 416 (e.g., the user approval) to host processing system 204. For example, directory system 222 may retrieve an authentication token from a storage device in directory system 222 and send that authentication token over network 218 to first network controller 214a such that is it sent over bus 216a by first network controller 214a to host processor 204a in host processing system 204.

Method 300 then proceeds to block 316, where host processing system 204 logs the user into IHS 202. In an embodiment, in response to receiving the authorization token from directory system 222, host processor 204a operates at block 316 to log user 402 into user IHS 202 such that user 402 may access functionality of user IHS 202 including, for example, an OS. For example, the authorization token provided by directory system 222 may be a Kerberos protocol token that allows user 402 to automatically log into IHS 202 and that may be used by host processing system 204 to access network resources.

Thus, systems and methods for out-of-band authentication have been described that provide for a user to authenticate to an external off-host authentication processing system in order to access functionality of an IHS that is provided by a host processing system. The authentication of a user to access the functionality of the IHS is controlled by the external off-host authentication processing system that operates to verify the user and release a token to the host processing system that provides the user access to the functionality of the IHS.

In some embodiments, the verification of the user may be performed by the authentication IHS such that the IHS never stores authentication credentials for a user, while authentication tokens are encrypted and exchanged between the external off-host authentication processing system and the authentication IHS such that the authentication IHS can send an approval message to the directory system to provide for the release of a token to the host processing system that allows the user access to the IHS if they have been validated. Because the host processing system and the external off-host authentication processing system need not interact in the out-of-band authentication system, the host processing system and the external off-host authentication processing system may be physically segregated (e.g., there may be no communications bus connecting or directly connecting host processing system 204 and external off-host authentication processing system 206) to prevent any access or compromise of the host processing system from enabling an unauthorized user to access functionality of IHS 202.

Figure 6:
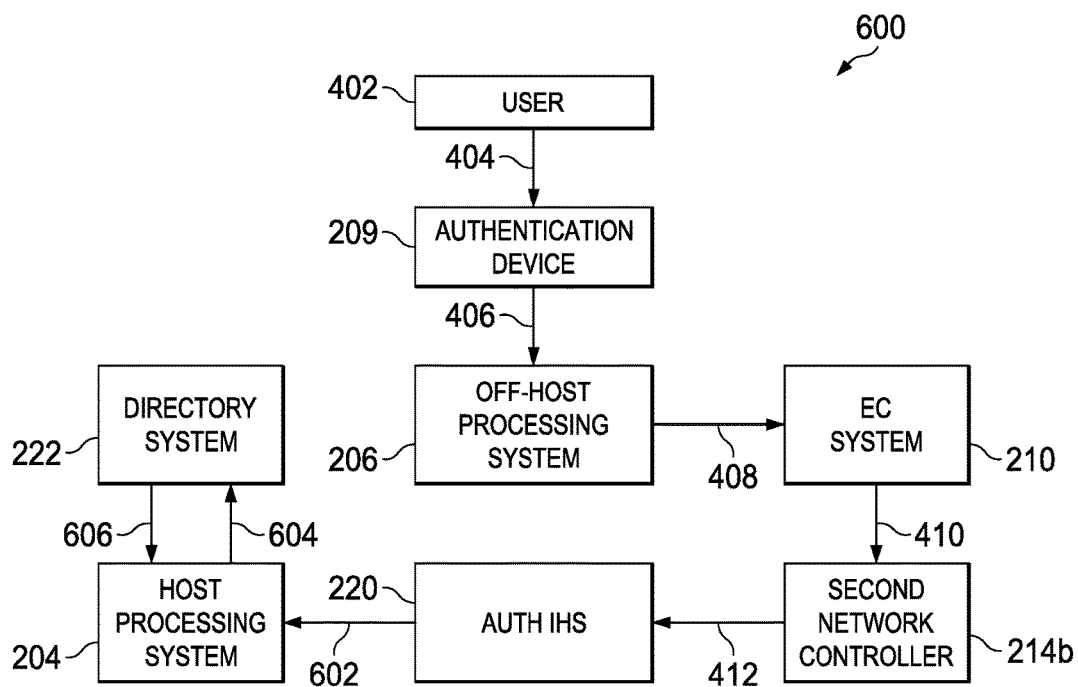
FIG. 6 is a schematic flow diagram illustrating an example of communications in the environment of FIG. 2 during execution of the method of FIG. 5 according to some embodiments.
Figure 5:
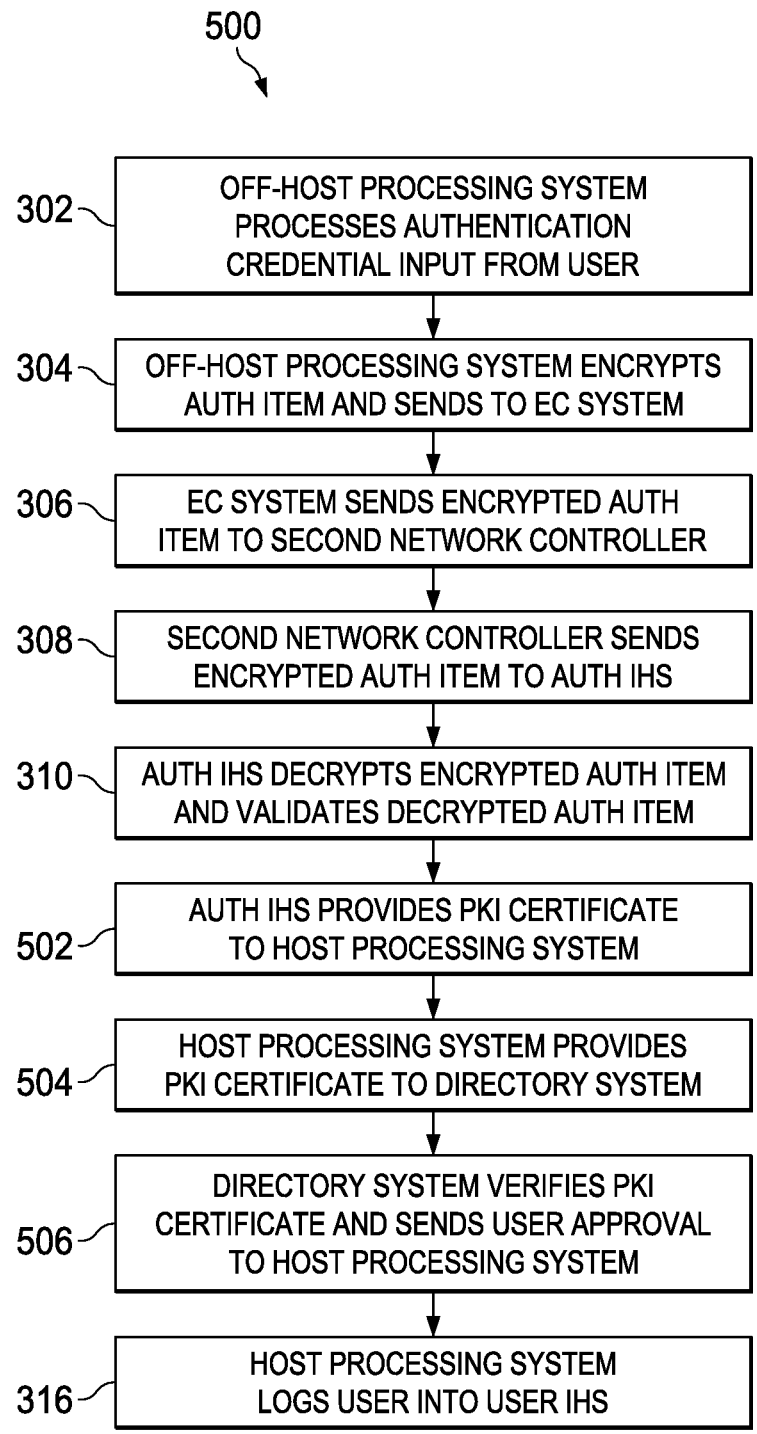
FIG. 5 is a flowchart illustrating another example of a method for off-host authentication according to some embodiments.

Referring now to FIGS. 2, 5, and 6, an embodiment of method 500 for providing off-host authentication is illustrated that is similar to method 300 but with blocks 502, 504, and 506 replacing block 312 and 314. As such, operation of the out-of-band authentication system 200 according to blocks 302, 304, 306, 308, 310, and 316 of the method 500 is substantially similar as described above for method 300, and thus is not repeated below. Method 500 is described with reference to schematic flow 600 of FIG. 6 that illustrates an embodiment of the flow of communications between the components of off-host authentication system 200 during execution of method 500.

Following block 310 of method 500 where authentication IHS 220 decrypts the encrypted authentication item and validates the decrypted authentication item, as discussed above, method 500 then proceeds to block 502 where authentication IHS 220 provides an approval message, which in this embodiment is an asymmetric key pair protected message such as, for example, the public key infrastructure (PKI) certificate, to host processing system 204.

While a PKI certificate that involves a trusted certificate authority is used in the examples below, other types of asymmetric key pair protected messages that do not involve a trusted authority may also be used. In an embodiment, following the validation of the decrypted authentication item, authentication IHS 220 operates to retrieve an access request token (which may be a "certificate") that is associated with the decrypted authentication item in a database in authentication IHS 220, protect that access request token with an asymmetric key pair, and send the asymmetric key pair protected access request token 602 (e.g., the PKI certificate) over network 218 to first network controller 214a such that the first network controller 214a sends that asymmetric key pair protected access request token 602 over bus 216a to host processor 204a in host processing system 204.

For example, authentication IHS 220 may encrypt the access request token using a public key of host processing system 204, and then encrypt that public-key-encrypted access request token using a private key of authentication IHS 220. In an embodiment, a PKI certificate used at block 502 may include a digital certificate that is created by authentication IHS 220 (e.g., a certificate authority) by digitally signing a set of data that may include a name of user 402 and/or other attributes that uniquely identify user 402 (e.g., an employee number), a public key associated with user 402, a validity period of the PKI certificate, an authentication operation for which the public key associated with user 402 will be used, and/or a variety of other PKI certificates elements. In some embodiments, host processor 204a may store the PKI certificate received at block 502 in host memory 204b.

Method 500 then proceeds to block 504 where host processing system 204 provides the approval message, which in this embodiment is the PKI certificate, to directory system 222. In some embodiments of block 504, host processor 204a may decrypt the asymmetric key pair protected access request token using the public key of authentication IHS 220 and its private key, encrypt the resulting access request token with a public key of directory system 222, and encrypt that public-key-encrypted access request token with the private key of host processing system 204. Host processor 204a may then send that asymmetric key pair protected access request token 604 (e.g., the PKI certificate) through the bus 216a to the first network controller 214a such that the first network controller 214a sends that asymmetric key pair protected access request token 604 over the network 218 to the directory system 222. In some embodiments, host processor 204a may store the asymmetric key pair protected access request token 602 received from authentication IHS 220 in host memory 204b, while in other embodiments of block 504, host processor 204a may immediately process and forward the asymmetric key pair protected access request token 602 received from authentication IHS 220 (i.e., without storing that PKI certificate in the host memory 204b) through bus 216a to first network controller 214a such that first network controller 214a sends that asymmetric key pair protected access request token 604 over network 218 to directory system 222.

Method 500 then proceeds to block 506 where the directory system verifies the approval message, which in this embodiment is the PKI certificate, and sends a user approval to the host processing system. In an embodiment, in response to receiving the PKI certificate from host processing system 204, directory system 222 operates at block 506 to determine whether the PKI certificate is valid and, if so, sends a user approval 606 over network 218 to first network controller 214a such that user approval 606 is sent to host processor 204a. For example, directory system 222 may decrypt the asymmetric key pair protected access request token 604, verify the resulting access request token, create an access token (e.g., a Kerberos protocol token), encrypt that access token with a public key of host processing system 204, and encrypt the public-key-encrypted access token with a private key of directory system 222.

Directory system 222 may the send the asymmetric key pair protected access token 606 (e.g., the user approval) over the network 218 to the host processing system 204. Method 500 then proceeds to block 316 where the host processing system logs the user into the user IHS. In an embodiment, in response to receiving the user approval from directory system 222, host processor 204a operates at block 316 to log user 402 into user IHS 202 such that user 402 may access functionality of IHS 202 including, for example, an OS. In an embodiment, host processing system 204 may decrypt the asymmetric key pair protected access token 606 received from directory system 222 and provide that access token to any resource that requests authentication in the network.

Thus, systems and methods for out-of-band authentication have been described that provide for a user to authenticate to an external off-host authentication processing system in order to access the functionality of an IHS that is provided by a host processing system. The authentication of a user to access the functionality of an IHS is controlled by the external off-host authentication processing system that operates to verify the user and release a token to the host processing system that provides the user access to the functionality of the IHS.

In some embodiments, the verification of the user may be performed by the authentication IHS such that the user IHS never stores authentication credentials for a user, while authentication tokens are encrypted and exchanged between the external off-host authentication processing system and the authentication IHS such that the authentication IHS can send a PKI certificate to the host processing system that is then provided by the host processing system to the directory system to obtain a user approval from the directory system that allows the user access to the IHS. Because the host processing system and the external off-host authentication processing system need not interact in the out-of-band authentication system, the host processing system and the external off-host authentication processing system may be physically segregated (e.g., there may be no communications bus connecting the host processing system and the external off-host authentication processing system) to prevent any access or compromise of the host processing system from enabling an unauthorized user to access functionality of IHS 202.

In summary, external off-host authentication processing system 206 provides a secure off-host processor, segregated from host processing system 204, which can be connected to IHS 202 (or any other IHS). To deliver expanded secure storage and evaluation of user data, external off-host authentication processing system 206 may provide a secure and protected processing environment which allows for storage of objects (i.e., within off-host memory 206b) and credential evaluation (i.e., by off-host processor 206a). The external off-host authentication processing system 206 may use a secure and dedicated authentication input to the processing environment for credential evaluation, for example, via authentication system 209. Moreover, protected objects stored within off-host memory 206b may be released based upon authentication events generated via authentication system 209.

In order to facilitate use of a same instance of external off-host authentication processing system 206 across many different instances of IHSs 202, external off-host authentication processing system 206 may be implemented in the form of a USB puck, dongle, thumb drive, or other portable device. For example, the same user may have access to various IHSs (e.g., one at work and another at home, etc.), and that user may plug his or her external off-host authentication processing system 206 into each distinct IHS at different times. Objects stored within external off-host authentication processing system 206 may be able to be programmatically tied to a specific host processor environment by a shadow function within a storage Application Programming Interface (API) which can silently verify an IHS's identity and associate that identity with the object within off-host memory 206b.

In various embodiments, external off-host authentication processing system 206's object storage controller and/or off-host processor 206a may mandate that a "system ID" be included in all object authentication factors based on a calling application's policy. Moreover, off-host authentication processing system 206 may employ a USB Type-C bus that allows for enhanced direct communication to embedded controller system 210—or it may employ another protocol that also cryptographically ties communications between off-host authentication processing system 206 and embedded controller system 210 without intervention by any Operating System (OS) executed by IHS 202.

Figure 7:
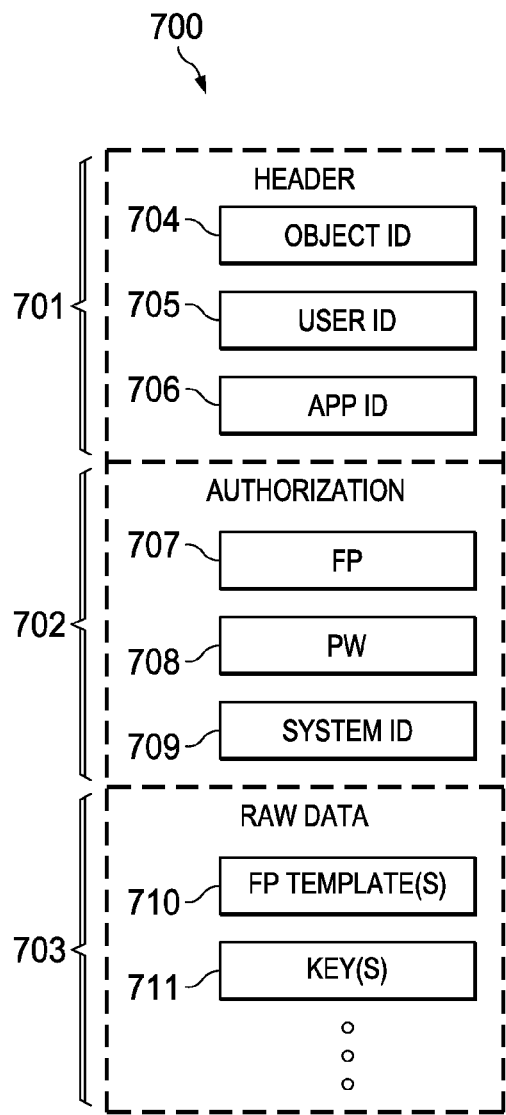
FIG. 7 is a diagram of an example of an object stored in an external off-host authentication processing system according to some embodiments.

FIG. 7 is a diagram of an example of object 700 stored in off-host memory 206b of external off-host authentication processing system 206. In some embodiments, object 700 includes three main sections: header portion 701, authorization portion 702, and raw data portion 703. Header portion includes object ID 704, user ID 705, and application ID 706; each of which may be present in the form of a uniquely identifying string of data. Particularly, object ID 704 refers to an address or pointer within off-host memory 206b where object 700 resides. User ID 705 includes an identification of one or more users who created and/or accessed object 700, or are otherwise allowed to retrieve object 700 from off-host memory 206b. And application ID 706 is an identification of the application that stored object 700 onto off-host memory 206b. In various embodiments, object ID 704, user ID 705, and application ID 706 may be used, for example, as part of off-host processor 206a's indexing operation of objects stored in off-host memory 206b.

Authorization portion 702 includes, in this example, fingerprint 707, password or passcode 708, and system ID 709. In other examples, however, other forms of authorization may be used (e.g., certificates, etc.). These various authorizations may correlate to the type of data within raw data section 703. Moreover, authorization portion 702 may also include other factors, such as a list of selected access controls (e.g., read, write, delete, etc.).

Fingerprint 707 and/or passcode 708 may include information necessary for off-host processor 206a to perform a credential matching operation against user information collected through authentication system 209, as previously described. Again, fingerprint 707 and/or passcode 708 (primary authentication information) are usable to enable off-host authentication processing system 206 to verify a user's identity as part of a determination of whether object 700 can be retrieved from off-host memory 206b.

In contrast, system ID 709 (secondary authentication information) may be generated by generated by embedded controller 210 and it is usable by off-host authentication processing system 206 to enable off-host authentication processing system 206 to verify an IHS's identity as part of the determination of whether object 700 can be retrieved from off-host memory 206b and provided to that particular IHS. This secondary verification may be performed, for example, depending upon whether a calling application's policy also requires that an IHS authentication be performed. In some embodiments, system ID 709 may include a unique identification of a hardware component of the IHS, such as a processor ID, CPU ID, BIOS ID, etc. In other embodiments, system ID may include a unique identification or signature generated based upon one or more software components installed in the IHS, or a combination of hardware and software components.

Raw data portion 703, in this example, includes fingerprint template(s) 710 and encryption keys 711, although any other protected data or credentials may be stored. In some cases, raw data portion 701 is the portion of object 700 that is retrieved by a calling application executed by the IHS upon verification of the data stored in authorization portion 702, for instance, in order to log a user onto the IHS or to allow the user to access certain secured functionality of the IHS.

Figure 8:
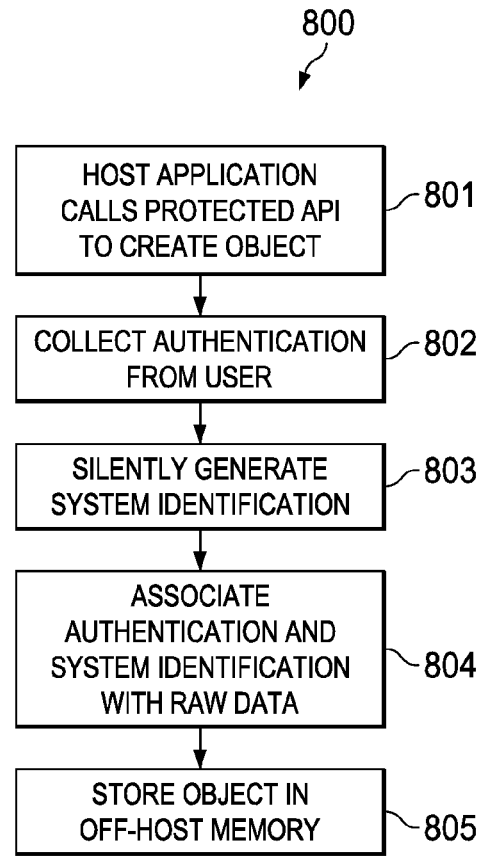
FIG. 8 is a flowchart illustrating an example of a method for storing an object in an external off-host authentication processing system according to some embodiments.

FIG. 8 is a flowchart illustrating an example of method 800 for storing object 700 in external off-host authentication processing system 206 according to some embodiments. At block 801, a host application—that is, an application being executed by host processing system 204 of IHS 202 under control of an OS—makes a call, via a protected API, to create object 700 to be stored in off-host memory 206b of external off-host authentication processing system 206. At block 802, off-host processor 206a collects user authentication information from the user including, for example, fingerprint 707 and/or passcode 708 via authentication system 209. As such, block 802 is typically performed with consent, prompt, and/or notice to the user.

At block 803, off-host authentication processing system 206 receives system ID 709 for IHS 202 as generated by embedded controller 210. Again, system ID 709 may be a hardware and/or software identifier that is unique to IHS 202. Moreover, system ID 709 may be obtained without consent, prompt, or notice to user, and typically entirely unbeknownst to the user—that is, "silently." At block 804, object 700 is assembled by associating the authentication information 707 and/or 708 with system ID 709 and raw data 703. Then, at block 805, object 700 is stored in off-host memory 206b such that is it entirely segregated from host memory 204b of IHS 202.

Figure 9:
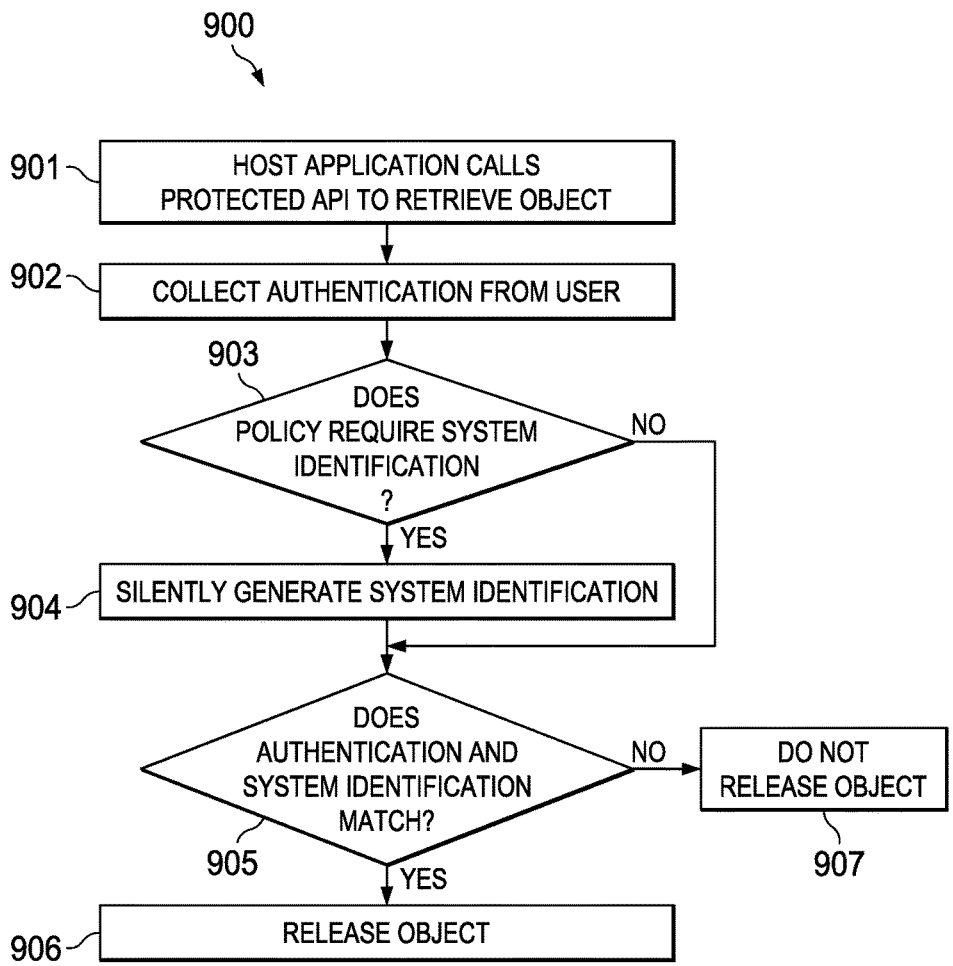
FIG. 9 is a flowchart illustrating an example of a method for retrieving an object from an external off-host authentication processing system according to some embodiments.

FIG. 9 is a flowchart illustrating an example of method 900 for retrieving object 700 from external off-host authentication processing system 206 according to some embodiments. At block 901, a calling application executed by host processing system 204 of IHS 202 makes a call, via the protected API, to retrieve an object 700 stored in off-host memory 206b of external off-host authentication processing system 206. At block 902, off-host processor 206a collects user authentication information, for example, via authentication system 209. At block 903, method 900 determines whether the calling application has a policy which requires that an identity of the IHS be authenticated. If so, embedded controller 210 at block 904 silently generates the IHSs system ID. Otherwise, method 900 proceeds to block 905.

At block 905, off-host processor 206a determines whether the user authentication information and/or system ID (depending upon the outcome of block 903) matches authentication information 707 and 708 and system ID 709 stored in object 700. If so, then external off-host authentication processing system 206 releases object 700 to IHS 202 at block 906; otherwise the object is not released at block 907.

For example, in a scenario where an object is created while external off-host authentication processing system 206 is coupled to a first IHS, and then the same object is attempted to be retrieved while external off-host authentication processing system 206 is still coupled to that first IHS, the system ID received or generated at block 904 will match system ID 709 stored in the object, and therefore the object is retrieved (assuming the user is authenticated as well). Conversely, when the object is created in a first IHS (e.g., a work computer) while external off-host authentication processing system 206 is coupled to the first IHS, and then the same object is attempted to be retrieved when external off-host authentication processing system 206 is now coupled to a second IHS (e.g., a home computer), the system ID received or generated at block 904 will not match system ID 709 stored in the object, and therefore the object is not retrieved (regardless of whether the user is authenticated). Moreover, because the manipulation of system ID during object creation and retrieval is transparent to the user, these techniques can add an additional and unique layer of data security and protection.

Accordingly, the various systems and methods described herein may provide object storage logic that allows for association to specific platform while maintaining manageability of stored secret. In some cases, platform detection may be performed via secure device driver enablement. A policy option may force platform or system ID into object authorization 702 for all objects at object storage level which will be unknown to a user or calling application. Moreover, these various techniques include allowances for authentication within external off-host authentication processing system 206 to release wake on authentication events via external devices, as well as the ability to communicate over USB-C and initiate EC directed communications (for protected/out of band evaluations).

It should be understood that various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Although the invention(s) is/are described herein with reference to specific embodiments, various modifications and changes may be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. A method, comprising:
identifying, by an Information Handling System (IHS), raw data to be stored within an object in an off-host memory of an external off-host authentication processing system coupled to the IHS, wherein the external off-host authentication processing system provides a hardware environment segregated from the IHS;
collecting authentication data from a user by prompting the user;
silently generating a system identification (ID) that uniquely characterizes the IHS without prompting the user;
storing the authentication data, the system ID, and the raw data as part of the object in the off-host memory;
receiving, at the external off-host authentication processing system, a request from a calling application executed by the IHS to access the object stored in the off-host memory;
making a call, via a protected Application Programming Interface (API), to retrieve the object;
collecting, via the IHS, new authentication data from a user by prompting the user;
silently generating, via the IHS, a new system ID without prompting the user;
determining, by the external off-host authentication processing system, that the new authentication data and new system ID match the authentication data and system ID stored in the object; and
retrieving, by the external off-host authentication processing system, the object from the off-host memory.

2. The method of claim 1, wherein the raw data includes an encryption key or fingerprint template.

3. The method of claim 1, wherein the authentication data includes a fingerprint template, a magnetic card scan, a Radio Frequency Identification (RFID) scan, a Smart Card scan, a face recognition template, an iris template, a certificate, or a passcode.

4. The method of claim 1, wherein generating the system ID includes retrieving or generating an identification of a hardware component of the IHS.

5. The method of claim 4, wherein the system ID includes an identification of a Central Processing Unit (CPU) of the IHS.

6. The method of claim 1, wherein generating the system ID includes retrieving or generating an identification or signature of a software component installed in the IHS.

7. The method of claim 1, wherein the external off-host authentication processing system is coupled to the IHS using a protocol that cryptographically tie communications between the external off-host authentication processing system and an embedded controller (EC) of the IHS without intervention by any Operating System (OS) executed by the IHS.

8. The method of claim 1, further comprising:
receiving, at the external off-host authentication processing system, a request from a calling application executed by the IHS to access the object stored in the off-host memory;
collecting, via another IHS, new authentication data from a user by prompting the user;
generating, via the other IHS, a new system ID without prompting the user;
determining, by the external off-host authentication processing system, that the new authentication data matches the authentication data stored in the object but that the new system ID does not match the system ID stored in the object; and
denying the request.

9. An external off-host authentication processing system, comprising:
an off-host processor; and
a non-transitory, off-host memory coupled to the off-host processor, the off-host memory having program instructions stored thereon that, upon execution by the off-host processor, cause the external off-host authentication processing system to:
receive, from an Information Handling System (IHS) coupled to the external off-host authentication processing system, raw data, authentication data, and a system ID, wherein the authentication data is collected via the IHS by prompting a user, and wherein the system ID is silently generated via the IHS without prompting the user;
store the authentication data, the system ID, and the raw data as part of an object in the off-host memory;
receive a request from a calling application executed by the IHS to access the object stored in the off-host memory, wherein the request includes new authentication data obtained by the IHS from a user by prompting the user and a new system ID silently obtained by the IHS without prompting the user;
determine that the new authentication data and new system ID match the authentication data and system ID stored in the object; and
retrieve the object from the off-host memory.

10. The external off-host authentication processing system of claim 9, wherein the raw data includes an encryption key or fingerprint template.

11. The external off-host authentication processing system of claim 9, wherein the system ID includes an identification of a hardware or software component of the IHS.

12. The external off-host authentication processing system of claim 9, wherein the IHS comprises an embedded controller coupled to a processor, wherein the external off-host authentication processing system is coupled to the embedded controller, and wherein the external off-host authentication processing system provides a hardware environment segregated from the processor.

13. The external off-host authentication processing system of claim 9, wherein the program instructions, upon execution by the off-host processor, further cause the external off-host authentication processing system to:
receive a request from a calling application executed by another IHS to access the object stored in the off-host memory, wherein the request includes new authentication data obtained by the other IHS from a user by prompting the user and a new system ID obtained by the other IHS without prompting the user;
determine that the new authentication data matches the authentication data stored in the object but that the new system ID does not match the system ID stored in the object; and
deny the request.

14. A non-transitory, off-host memory having program instructions stored thereon that, upon execution by an off-host processor of an external off-host authentication processing system, further cause the external off-host authentication processing system to:

receive, from an Information Handling System (IHS) coupled to the external off-host authentication processing system, raw data, authentication data, and a system ID, wherein the authentication data is collected via the IHS by prompting a user, and wherein the system ID is silently generated via the IHS without prompting the user;

store the authentication data, the system ID, and the raw data as part of an object in the off-host memory;

receive a request from a calling application executed by the IHS to access the object stored in the off-host memory, wherein the request includes new authentication data obtained by the IHS from a user by prompting the user and a new system ID silently obtained by the IHS without prompting the user;

determine that the new authentication data and new system ID match the authentication data and system ID stored in the object; and retrieve the object from the off-host memory.

15. The off-host memory of claim 14, wherein the system ID includes an identification of a hardware component or a software component installed in the IHS.

16. The external off-host authentication processing system of claim 14, wherein the IHS comprises an embedded controller coupled to a processor, wherein the external off-host authentication processing system is coupled to the embedded controller, and wherein the external off-host authentication processing system provides a hardware environment segregated from the processor.

17. The off-host memory of claim 14, wherein the program instructions, upon execution by the off-host processor, further cause the external off-host authentication processing system to:

receive a request from a calling application executed by another IHS to access the object stored in the off-host memory, wherein the request includes new authentication data obtained by the other IHS from a user by prompting the user and a new system ID obtained by the other IHS without prompting the user;

determine that the new authentication data matches the authentication data stored in the object but that the new system ID does not match the system ID stored in the object; and deny the request.

* * * * *